Oct. 12, 1971  K. HOFFMANN  3,611,488
MACHINE FOR CONTINUOUSLY CONSOLIDATING CHIPS
AND DUST PARTICLES OF LEATHER OR THE LIKE
Filed Sept. 5, 1968

INVENTOR.
Kazimir Hoffmann

BY Craig & Antonelli
Attorneys

United States Patent Office 3,611,488
Patented Oct. 12, 1971

3,611,488
MACHINE FOR CONTINUOUSLY CONSOLIDATING CHIPS AND DUST PARTICLES OF LEATHER OR THE LIKE
Kasimir Hoffmann, Forst, Germany, assignor to Badische Maschinenfabrik G.m.b.H., Karlsruhe-Durlach, Germany
Filed Sept. 5, 1968, Ser. No. 757,623
Claims priority, application Germany, Sept. 12, 1967,
P 16 60 047.8
Int. Cl. B29f *3/04, 3/06*
U.S. Cl. 18—12 SE          10 Claims

ABSTRACT OF THE DISCLOSURE

A worm extrusion press for continuously consolidating chips and dust particles of leather or the like into a solid body. This press may be additionally provided with a slotted reaction tube which permits the extruded body to expand to a certain extent so as to eliminate internal tensions or at first to be slightly compressed and then to expand.

---

Figure 1:
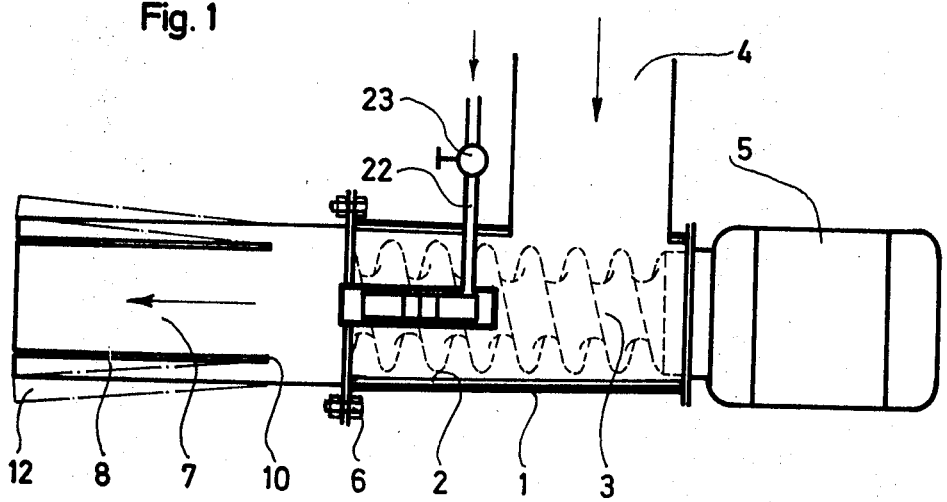

The present invention relates to a machine for continuously consolidating chips and dust particles of leather or the like.

In the manufacture of leather, there is one operation in which uneven parts of the leather are shaved off or the leather is reduced to a certain thickness primarily by sharp blade rollers which are driven at a high speed. The material which is thus shaved off forms loose chips. Since these chips when in a loose condition have a specific weight of about 0.2 ton per cubic meter, they require considerable space when transported or stored, and since they are of a small size and also contain very fine components they require tightly closing containers.

In another operation in the leather manufacture in which the leather is ground, the grinding dust is sucked off where it is formed and collected in textile filters. In a loose condition, these dust particles also take up considerable space and are therefore difficult to transport and store, and they also constitute a considerable danger of fire or self-combustion.

Although various efforts have been made to convert these materials to a more convenient condition, for example, by compressing them in a mold, these efforts have not been successful.

It is therefore an object of the present invention to provide a machine which permits these materials to be converted from their loose condition into solid bodies which may be easily manipulated, transported and stored.

For attaining this object, the machine according to the invention comprises an extruding worm of a type known as such which is rotatable with play in a cylindrical housing which is provided with longitudinal ribs on its inner wall and with an inlet through which the waste materials are fed. The machine further comprises a reaction tube directly subsequent to the extruding worm which is adjustable so as to compress and/or release the extruded material.

By extensive experiments it has now been found that, due to the particular fibrous structure of such chips and dust particles of leather, a lasting consolidation of these materials may be attained if they are extruded by a worm extruder and are then passed through a reaction tube. It has further been found that a cylindrical solid body which is thus produced has a specific weight of 0.8 to 1 ton per cubic meter, and has a sufficient internal solidity to satisfy all requirements which might occur in normal transport and storing of such bodies. The treatment according to the invention therefore reduces the volume of the materials to a quarter or a fifth of its original volume in a loose condition. Since this material is combustible, the almost complete expulsion of the air which occurs during its compression reduces the danger of fire very considerably.

Since these waste products are by no means worthless and may be subsequently employed in other industries for other purposes, for example, by being mixed in a comminuted condition with plastics, they may be very easily transported to such a place in the consolidated condition according to the invention and may then be fed to a comminuting machine whenever needed.

Since the waste materials which are to be treated according to the invention have the tendency to clog the extruding worm with the result that the longitudinal conveying movement of the material will stop, the invention further provides a gear wheel which has a tooth pitch in accordance with that of the worm and is rotatably mounted on the outside of the housing at one side thereof. This gear wheel engages through a slot in the wall of the housing between the threads of the worm and it is driven by the worm.

For consolidating some of the waste materials especially duct particles of leather, it is very desirable to moisten them. By experiments it was found that it is unsatisfactory to moisten these materials before they are fed into the machine since they are not easily moistened or will then not be uniformly moistened. This disadvantage may be eliminated entirely if according to another feature of the invention the worm and gear housings are tightly closed and a liquid supply line which is provided with a control valve is connected thereto.

Figure 2:
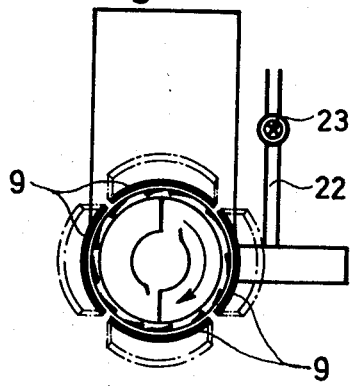
Figure 3:
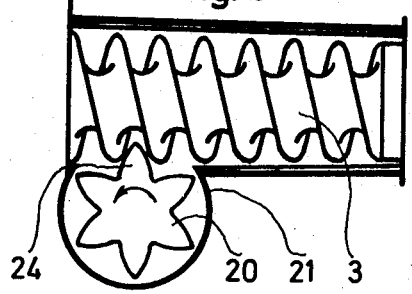
Figure 4:
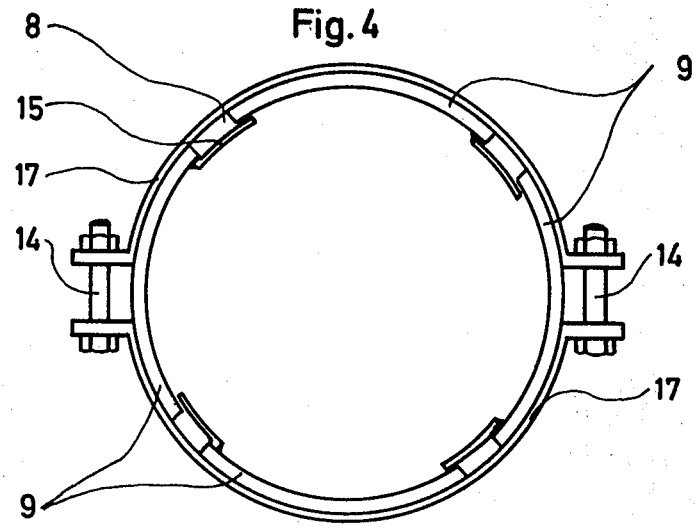
Figure 5:
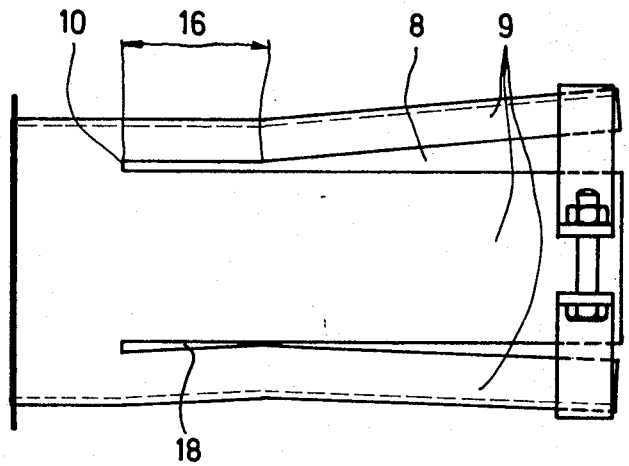

The features and advantages of the present invention will become further apparent from the following detailed description thereof which is to be read with reference to the accompanying drawings, in which:

FIG. 1 shows a vertical longitudinal section of the machine according to the invention with a reaction tube;
FIG. 2 shows a front view of the machine as seen from the left of FIG. 1;
FIG. 3 shows a horizontal longitudinal section of the worm and gear housings;
FIG. 4 shows a front view of the adjusting means at the end of the reaction tube; while
FIG. 5 shows a side view of a slotted reaction tube which is provided with outwardly bent sector-shaped sections.

As illustrating particularly in FIGS. 1 and 2 of the drawings, the machine according to the invention comprises a worm housing 1 which is provided with inner longitudinal ribs 2 and an inlet 4 and contains a worm 3 which may be driven by a motor 5. This motor 5 and a reaction tube 7 are connected to the opposite ends of the housing 1 by flanges and screws 6.

The inner diameter of the front part of the reaction tube 7 is adjustable which is accomplished by providing this tube with longitudinal slots 8 which divide its originally cylindrical shape into a plurality of sector-shaped sections or reaction-type spring fingers 9. When the reaction tube should effect a controlled release of the material, the sections or spring fingers 9 are bent outwardly at the starting points 10 of the slots, as indicated at 12 in FIG. 1.

FIG. 3 illustrates an embodiment of the invention in which a gear wheel 20 is mounted in a tightly-enclosing housing part 21 and is driven by its engagement with the worm 3 as indicated at 24. This part 24 of the gear which projects between the threads of the worm 3 prevents the worm from being clogged and the material from being turned by the worm without being conveyed in the longitudinal direction.

For moistening the material while being conveyed by the worm 3, a liquid-supply line 22 is provided and the amount of liquid supplied may be controlled by a control valve 23.

For adjusting the front part of the reaction tube 7 to a certain inner diameter, a clamping ring 17 may be mounted on its free end, as shown in FIGS. 4 and 5, and may be tightened or loosened by screws 14. This clamping ring 17 has been omitted in FIGS. 1 and 2 for a better illustration of the other structure. Regardless of the diameter to which the reaction tube 7 may be adjusted, the slots 8 will always be covered at the inner side of the wall of this element by overlapping strips 15.

If the material in the reaction tube 7 is to be at first compressed and then released to a controlled extent, as shown at the lower part of FIG. 5, each of the individual sections 9 of the slotted part of the reaction tube is bent outwardly at a point which is spaced at a distance 16 from the starting point 10 of the slot 8 (see the upper part of FIG. 5). When the clamping ring 17 is then adjusted to a smaller diameter, the shape of the reaction tube 7 will be changed as indicated at 18 with the result that the material will at first be compressed and then released to a controlled extent.

The mode of operation of the machine according to the invention is as follows: The leather chips or the leather dust or other tannery waste products are inserted through the inlet 4, as shown in FIG. 4, and then pass into the worm 3 in which due to the effect of the subsequent reaction tube 7 and by the possible addition of a liquid through the line 22, they are compressed into a solid body which has only a quarter or a fifth of the volume which they had when inserted. The controlled release at the end of the reaction tube 7 has the effect that the compressed body emerges from the apparatus without internal tensions and without damage on its peripheral surface which might lead to undesirable losses of material. The extruded body may be divided into sections of a suitable length and may be conveyed by any normal conveying means and be stored within a small space without danger of fire.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A machine for continuously consolidating waste materials in the form of chips and dust particles of leather and the like comprising a housing having a cylindrical inner wall and longitudinal ribs on said inner wall, an extruding worm rotatably mounted with play in said housing so as to be surrounded by said longitudinal ribs, said housing having an inlet for feeding said waste materials to said worm, means connected to one end of said worm for rotating the same, and a reaction element connected to the other end of said housing subsequent to said worm to provide a releasing effect upon the material extruded by said worm, said reaction element consisting of a tube having a first part adjacent to said worm housing of substantially the same inner diameter as said housing and an integral following part formed by a plurality of longitudinal reaction-type spring fingers extending freely to the outlet end of said tube so that the inner diameter of the outlet end is adjustable between said diameter of the housing and a greater diameter than the housing by the consolidated material passing therethrough.

2. A machine as defined in claim 1, in which said housing has an aperture in one side thereof, and further comprising a gear wheel rotatably mounted at the outside of said housing and engaging through said aperture with said worm so as to be driven thereby, said gear wheel having a pitch in accordance with the pitch of said worm.

3. A machine as defined in claim 2, further comprising a second housing tightly enclosing said gear wheel and connected to said worm housing, means connected to one of said housings for supplying a liquid thereto, and means for controlling the amount of liquid supplied to said housing.

4. A machine as defined in claim 1, in which the inner diameter of the part of said tube following the part which is connected to said worm housing at first decreases and thereafter increases in a direction toward the outlet end of said tube.

5. A machine as defined in claim 1, in which said reaction tube has a plurality of longitudinal slots.

6. A machine as defined in claim 5, in which said reaction tube is provided at the inside with strips overlapping said slots.

7. A machine as defined in claim 5, in which the sections of said reaction tube intermediate said slots may be bent outwardly so as to increase the inner diameter of said tube, and clamping means on the end of said tube for adjusting said inner diameter.

8. A machine as defined in claim 7, in which the sections of said reaction tube intermediate said slots are bent conically outward following a point spaced at a certain distance from the closed ends of said slots toward the free end of said tube, whereby when said clamping means are tightened on said free end, said tube sections will be bent so that the inner diameter of said tube following the unslotted part thereof adjacent to said worm will gradually decrease within said distance up to said point and will thereafter gradually increase toward said free end.

9. A machine as defined in claim 8, in which said slots and said clamping means permit the inner diameter of the slotted part of said reaction tube to be adjusted so as to vary between a value of about —10% to a value of +20% as compared with the inner diameter of the unslotted part of said tube adjacent to said worm housing.

10. A machine as defined in claim 1, further comprising means for removably connecting said reaction tube to said worm housing.

References Cited
UNITED STATES PATENTS

| | | | |
|---|---|---|---|
| 1,403,294 | 1/1922 | Cowan | 100—DIG 8 |
| 1,577,015 | 3/1926 | Glaze | 100—DIG 8 |
| 2,672,807 | 3/1954 | McClellan et al. | 100—191 UX |
| 2,688,768 | 9/1954 | Rayburn | 18—12 TT X |
| 2,810,159 | 10/1957 | Teichmann | 18—12 SE |
| 2,889,581 | 6/1959 | Vanderhoof | 18—12 TT X |
| 3,044,391 | 7/1962 | Pellett | 25—14 X |
| 3,054,343 | 9/1962 | Pellett | 100—148 |
| 3,174,185 | 3/1965 | Gerber | 18—12 SE |
| 3,217,783 | 11/1965 | Rodenacker | 18—12 G UX |

ROBERT L. SPICER, JR., Primary Examiner

U.S. Cl. X.R.

100—148